United States Patent
Badino et al.

(10) Patent No.: US 11,780,496 B2
(45) Date of Patent: Oct. 10, 2023

(54) COMPONENT FOR A STEERING SUSPENSION OF A VEHICLE

(71) Applicants: AKTIEBOLAGET SKF, Gothenburg (SE); FCA ITALY S.p.A., Turin (IT)

(72) Inventors: Renato Badino, Turin (IT); Marco Falossi, San Raffaele Cimena (IT); Francesco Lamboglia, Pinerolo (IT); Carlo Pavesio, Turin (IT)

(73) Assignees: AKTIEBOLAGET SKF, Gothenburg (SE); FCA ITALY S.p.A., Turin (IT)

( * ) Notice: Subject to any disclaimer, the term of this patent is extended or adjusted under 35 U.S.C. 154(b) by 0 days.

(21) Appl. No.: 17/677,683

(22) Filed: Feb. 22, 2022

(65) Prior Publication Data

US 2022/0266904 A1  Aug. 25, 2022

(30) Foreign Application Priority Data

Feb. 23, 2021  (IT) .................. 102021000004070

(51) Int. Cl.
*B62D 7/18* (2006.01)
*B62D 7/20* (2006.01)
(Continued)

(52) U.S. Cl.
CPC ............ *B62D 7/20* (2013.01); *B60B 27/0063* (2013.01); *B60G 7/001* (2013.01); *B62D 7/18* (2013.01);
(Continued)

(58) Field of Classification Search
CPC ... B62D 7/20; B62D 7/18; B62D 7/00; B62D 7/16; B60G 7/001; B60G 7/00;
(Continued)

(56) References Cited

U.S. PATENT DOCUMENTS

| 4,491,340 A | 1/1985 | Von Grunberg et al. |
| 5,120,150 A | 6/1992 | Kozyra et al. |

(Continued)

FOREIGN PATENT DOCUMENTS

| CN | 210027582 U | 2/2020 |
| CN | 210680907 U | 6/2020 |

(Continued)

OTHER PUBLICATIONS

"Types of Ball Bearings in Bicycles" webpage; BocaBearings; https://www.bocabearings.com/bicycle-bearing-tips-tutorials/types-of-ball-bearings-in-bicycles#:~:text=The%20main%20disadvantage%20of%20cartridge,it%27s%20more%20costly%20than%20balls.; Dec. 23, 2022.*

(Continued)

*Primary Examiner* — Keith J Frisby
(74) *Attorney, Agent, or Firm* — Harness, Dickey & Pierce, P.L.C.

(57) ABSTRACT

A steering suspension of a vehicle includes a suspension upright and a mechanical component consisting of a radially outer ring of a wheel hub unit or of a rolling bearing forming part of a wheel hub unit. The outer ring is provided integral in one piece with a flange and a steering arm, extending radially cantilevered from the outer ring and the flange, with which it is also integral in one piece. On the side opposite to the steering arm the flange is integral in one piece with a pair of axially drilled radial lugs, configured to support, in use, a brake caliper.

10 Claims, 5 Drawing Sheets

(51) Int. Cl.
  *B60G 7/00* (2006.01)
  *F16D 65/00* (2006.01)
  *B60B 27/00* (2006.01)
  *F16D 55/00* (2006.01)

(52) U.S. Cl.
  CPC .... *F16D 65/0062* (2013.01); *B60G 2204/418* (2013.01); *B60G 2204/43* (2013.01); *B60G 2206/50* (2013.01); *F16D 2055/0012* (2013.01)

(58) Field of Classification Search
  CPC .......... B60G 2204/418; B60G 2204/43; B60G 2204/4304; B60G 2206/50; B60G 99/002; B60G 2200/44; F16C 2326/05; F16C 2326/24; B60B 27/0063; F16D 2055/0012; F16D 2055/0008; F16D 65/12; F16D 65/0062
  USPC ............. 280/124.126, 93.512, 93.51, 93.502
  See application file for complete search history.

(56) References Cited

U.S. PATENT DOCUMENTS

2003/0107259 A1* 6/2003 Rutter .................... B60B 27/00
                                                    301/6.8
2009/0010581 A1   1/2009 Takahashi

FOREIGN PATENT DOCUMENTS

| CN | 212149003 U | 12/2020 |
| EP | 0865941 A2 | 9/1998 |
| JP | H09272417 A | 10/1997 |

OTHER PUBLICATIONS

Search Report issued in corresponding Italian Patent Application No. 102021000004070 dated Nov. 9, 2021.

* cited by examiner

COMPONENT FOR A STEERING SUSPENSION OF A VEHICLE

CROSS-REFERENCE TO RELATED APPLICATIONS

This Patent application claims priority from Italian Patent Application No. 102021000004070 filed on Feb. 23, 2021, the entire disclosure of which is incorporated herein by reference.

TECHNICAL SECTOR OF THE INVENTION

The present invention relates to an innovative component intended to equip a steering suspension of a vehicle, the component concerned consisting of an outer ring of a wheel hub unit.

PRIOR ART

The interfaces in highly stressed mechanical assemblies are always a critical issue, both in the design step and while in use. The interface between the wheel hub unit and the suspension upright, particularly in the case of a steering suspension, i.e. provided with a steering arm, is an important example thereof.

In fact, the connection between the suspension upright and the wheel hub unit, usually made through the outer ring of the latter, is usually made by press-fit coupling (generally in the case of suspension uprights made by casting or forging cast iron or aluminium or light alloys), or by means of a flanged connection (second or third generation wheel hub units, generally in the case of suspension uprights made by stamping a metal sheet, in steel or aluminium/light alloy). A wheel hub unit of the latter type is known, for example, from US2009010581A1.

These types of connections result in high stresses at the connection interface between the outer ring of the wheel hub unit and the suspension upright which, in use, cause possible slippage over time, locking, loosening and noise generation (clicking noise), increased susceptibility to corrosion, etc.

Furthermore, since by definition an interface is composed of two faces, the use of the construction material is not optimised, since the material constituting each face of the coupling has to withstand essentially the same stresses and therefore the construction material required at the interface location almost doubles, resulting in greater weight and energy consumption.

On the other hand, the full integration of the outer ring of the rolling bearing composing/constituting the wheel hub unit and the suspension upright, particularly in the case of steering suspensions (i.e. those generally intended for the front wheels of the vehicle and therefore provided with a steering arm), can lead to excessive service costs and machining problems.

Finally, almost all the existing solutions cannot be used equally on both the left and the right side of the vehicle (i.e. on the driver's side and passenger's side) without being modified, and therefore require the use of different components, specific to each side of the vehicle, resulting in higher costs and production complexity.

SUMMARY OF THE INVENTION

The aim of the present invention is therefore to provide a component of a steering suspension of a vehicle consisting of an outer ring of a wheel hub unit (Hub Bearing Unit), which overcomes the drawbacks of the state of the art, in particular by reducing stresses at the interface between the outer ring and the suspension upright, while simplifying the design of the suspension upright. It is a further aim of the invention to provide such a component that can be used on steering suspensions equally intended for the right or left side of a vehicle.

According to the invention, there are provided a component of a steering suspension of a vehicle and an associated steering suspension of a vehicle, as well as an associated outer ring of a wheel hub unit, as defined in the appended Claims.

BRIEF DESCRIPTION OF THE DRAWINGS

Further characteristics and advantages of the present invention will become clear from the following description of non-limiting examples thereof, carried out with reference to the figures of the attached drawings, in which.

DETAILED DESCRIPTION

Figure 1:
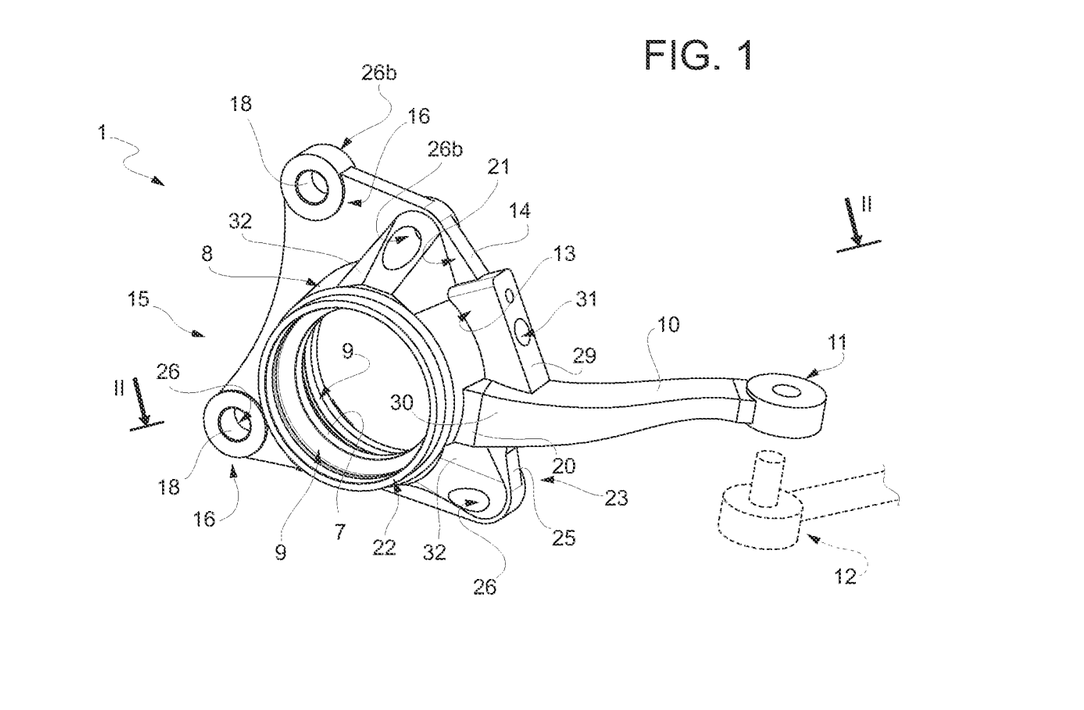
FIG. 1 schematically shows a three-quarter front and top axonometric view of a mechanical component of a steering suspension of a vehicle consisting of a bearing outer ring according to the invention forming part of a wheel hub unit otherwise known and not shown for ease of simplicity.
Figure 9:
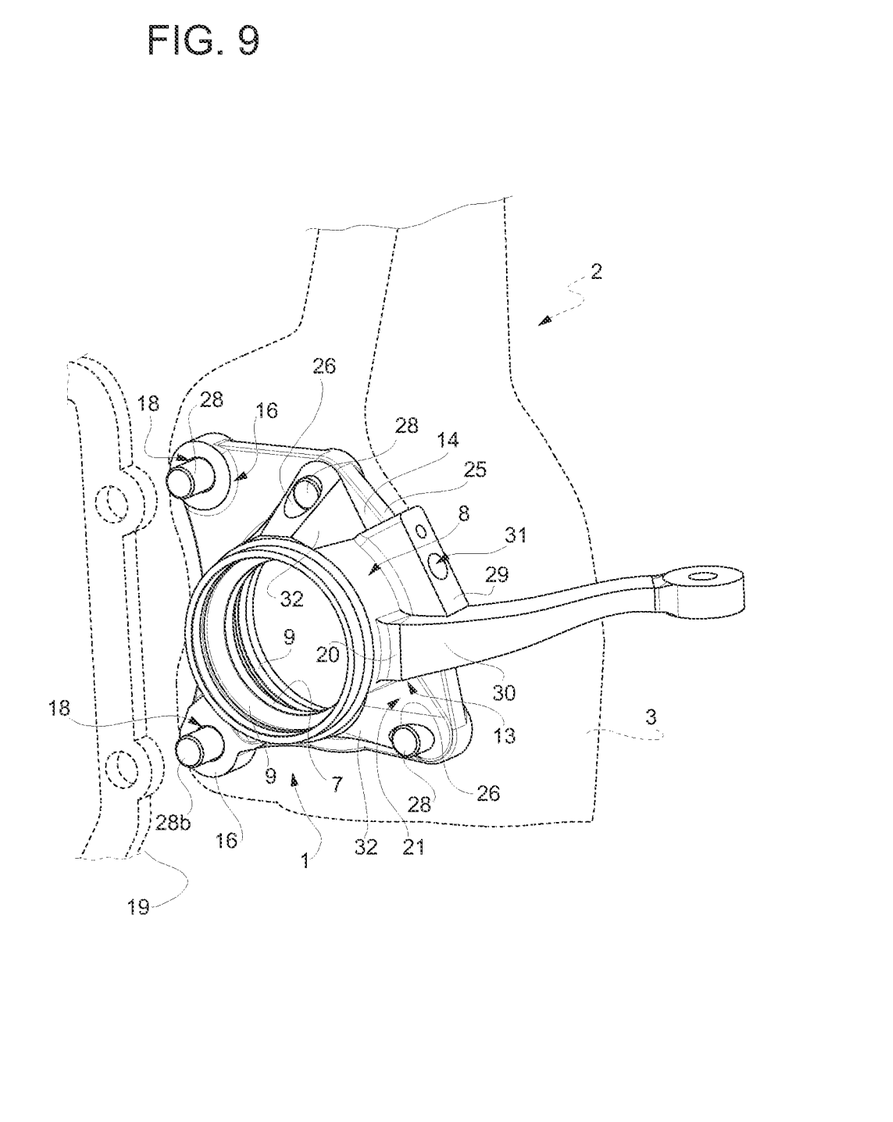
FIG. 9 schematically shows an axonometric view of a steering suspension of a vehicle equipped with the mechanical component of FIG. and with parts removed or shown only in dotted lines for ease of simplicity.

With reference to FIGS. 1 and 9, an annular mechanical component of a steering suspension 2 of a vehicle (shown only schematically and only partially, for ease of simplicity) is overall denoted by 1. The suspension 2 comprises a suspension upright 3, however configured, and a wheel hub unit 4 (FIG. 4).

The mechanical component 1 consists, according to one aspect of the invention, of a radially outer ring of the wheel hub unit 4, or of a rolling bearing (known and not shown for ease of simplicity) forming part of the wheel hub unit 4.

Figure 4:
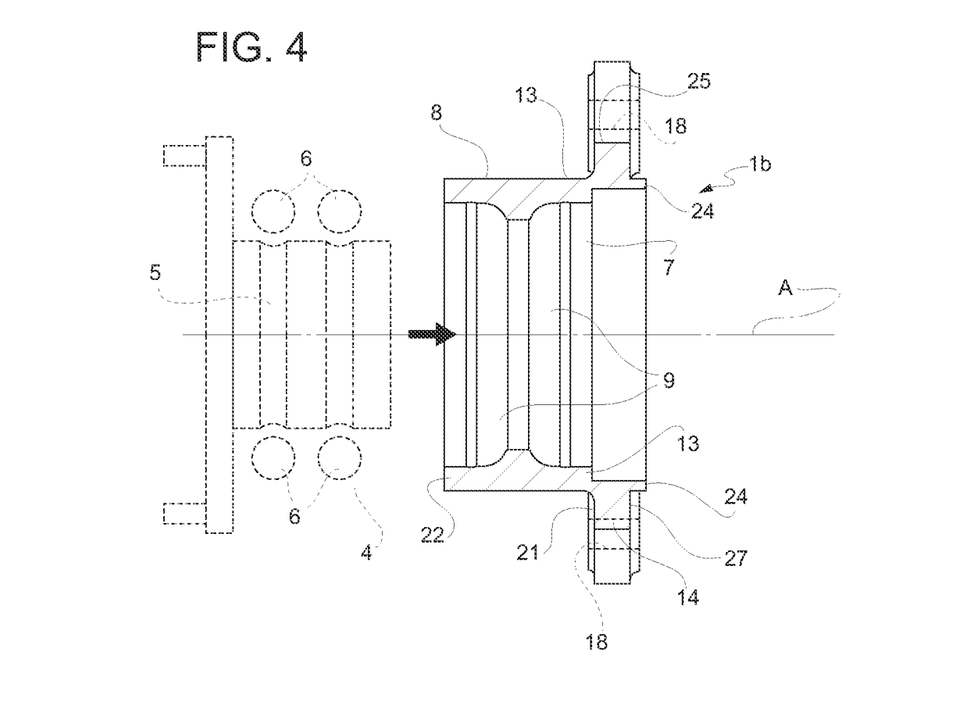
FIG. 4 schematically shows in an enlarged scale and in radial section according to a trace plane IV-IV the mechanical component of FIG. 3.

In the non-limiting example shown with specific reference to FIG. 4, the wheel hub unit 4 is shown only schematically and only partially, with some components thereof shown only in dotted lines.

The wheel hub unit 4, in addition to the annular mechanical component consisting of the outer ring 1, comprises, in the non-limiting example shown, an annular mechanical component 5, rotating and radially internal to the ring 1, including a flanged bearing inner ring or a spindle supporting an inner bearing ring (in any case, such a radially inner annular component 5 is shown in FIG. 4 only schematically in dotted lines, out of scale and without details, only in one of its external outlines) configured to receive in use, in a known manner, a vehicle wheel (known and not shown) and operatively rotatably coupled to the outer ring 1 by means of a plurality of rolling elements 6 interposed in a crown between the annular components 1 and 5.

Figure 2:
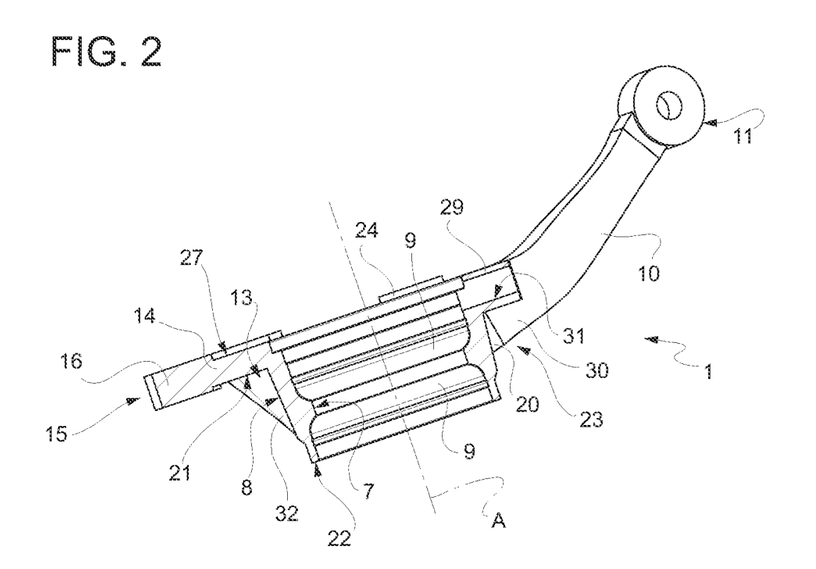
FIG. 2 schematically shows in an enlarged scale and in a radial section according to a trace plane II-II the mechanical component of FIG. 1.

The radially outer ring 1 (FIG. 1) is bounded between a radially inner lateral surface 7 and a corresponding radially outer lateral surface 8 substantially coaxial with the radially inner lateral surface 7. Both lateral surfaces 7 and 8 are annular surfaces of revolution, e.g. cylindrical, and have a common axis of symmetry A (FIG. 2).

The radially inner annular surface 7 is provided with at least one annular raceway 9 (of a pair of raceways 9 placed side by side, arranged axially in tandem, in the example shown) for the respective rolling elements of the wheel hub unit 4.

According to a first substantial aspect of the invention, from the radially outer lateral surface 8, a steering arm 10 (of any known shape and type) provided with at least one interface, i.e. a respective (known) engagement point or element 11, for a steering tie rod 12 known and shown only schematically in hatching in FIG. 1 for ease of simplicity, extends radially cantilevered from the outer ring 1.

Furthermore, and in combination with the foregoing, from a first axial end 13 of the radially outer lateral surface 8, a flange 14 configured to be connected in use integrally to the suspension upright 3, extends radially cantilevered from the outer ring 1.

According to a further substantial aspect of the invention, the flange 14 is provided radially cantilevered on a first side 15 thereof with at least one pair of lugs or studs 16 machined integrally in one piece (i.e. as one piece only, without connections or welds of any kind) with the flange 14 and each one provided with a first through-hole 18, that is axial as it is oriented parallel to the axis of symmetry A, which, apart from the arm 10 and the lugs 16, is also the axis of symmetry of the outer ring 1.

The lugs or studs 16 with the holes 18 are configured to support in use, in the manner that will be seen, and integrally with the outer ring 1, a brake caliper 19, known, shown only schematically and by hatching in FIG. 9.

According to the invention, the steering arm 10 and the flange 14, with the lugs or studs 16 are all integrally machined in one piece with each other and with the outer ring 1. For example, the entire component consisting of the outer ring 1 with the arm 10 and the flange 14 with the lugs 16 is cast or forged in one piece and then mechanically machined for the necessary parts.

Thereby, if compared to the state of the art, the connection for the brake caliper 19 (consisting of the lugs or studs 16) and the steering arm are "detached" from the suspension upright 3 and "transported" to an annular component such as the outer ring 1, which is directly provided with the raceways 9 for the rolling elements 6 of the wheel hub unit 4.

It is therefore possible to stress the connection interface between the annular component 1 and the suspension upright 3 much less and to optimise the distribution of the construction material required to make these two components 1 and 3.

According to a further aspect of the invention, the steering arm 10, for at least a first section 20 thereof facing the side of the radially outer lateral surface 8, is made integrally in one piece with a first face 21 of the flange 14 facing a second axial end 22 of the radially outer lateral surface 8, opposite to the first end 13.

The first section 20 of the steering arm 10 therefore forms, i.e. is configured as, a first radial rib of the flange 14 arranged on the first face 21.

Furthermore, the steering arm 10 extends radially cantilevered from the flange 14 on the side of a second side 23 of the flange 14 opposite to the first side 15, so that the steering arm 10 and the lugs 16 extend cantilevered from the outer ring 1 on opposite sides thereof.

The outer ring 1 is provided, at the first axial end 13 of the radially outer lateral surface 8, with an annular centering collar (collet) 24, which is for centering the component 1 with respect to the suspension upright 3 during coupling and/or required during machining.

According to a preferred embodiment of the invention, the flange 14 of the component 1 is annular and is provided passing near a radially outer edge 25 thereof of a plurality (i.e. two or more, such as three or four or five, angularly spaced apart) of second holes 26 parallel to the first holes and configured to couple in use the flange 14 solidly to the suspension upright 3.

In particular, a second face 27 of the flange 14, opposite and parallel to the first face 21, is configured to couple in use in contact with the suspension upright 3, also due to the presence of the collet 24.

The second holes 26 are then configured to receive internally respective removable connecting elements 28, such as screws or bolts or pins, preferably at least partially threaded (FIG. 9), on the side of the second face 27 of the flange 14, so that they may also be inserted through the suspension upright 3 provided with corresponding through-holes (known and not shown for ease of simplicity) to obtain the integral fixing of the flange 14 (and consequently of the whole component 1 and of the wheel hub unit 4) to the suspension upright 3.

According to possible variants not shown, such fixing may also be obtained by means of non-removable (unless broken) connecting elements such as nails, always inserted through the holes 26.

According to the embodiment of FIGS. 1 and 2 (and 9), a pair 26b of second holes 26 coincide with, i.e., are machined in correspondence with, the first holes 18 and are configured to receive in a passing-through manner respective pins or screws 28b in turn configured to protrude axially cantilevered from the lugs or studs 16 and support the brake caliper 19 (FIG. 9), which is coupled onto the lugs 16 on the side of the first face 21 of the flange 14.

From the radially outer lateral surface 8 of the outer ring 1 extends radially cantilevered, preferably also radially cantilevered with respect to the flange 14, a plate 29 formed integrally in one piece with the flange 14 and with the steering arm 10 and which connects for a circumferential section of the flange 14 the flange 14 itself to a portion 30 of the steering arm 10 which protrudes radially from the flange 14 and which is immediately adjacent to the flange 14.

The plate 20 is preferably provided with at least one radial seat 31 for a respective sensor (known and not shown for ease of simplicity, for example for ABS/wheel revolutions and/or temperature), the seat 31 being radially accessible from the outside.

According to an aspect of the invention, the flange 14 is provided in correspondence with at least some of the second holes 26 with respective radial ribs 32 obtained integrally in one piece on the first face 21, projecting axially towards the second axial end 22 of the radially outer side surface 8; the second holes 26, with the exclusion of the holes 26b when present, are obtained at least partially within the radial ribs 32, if the latter are present.

Figure 3:
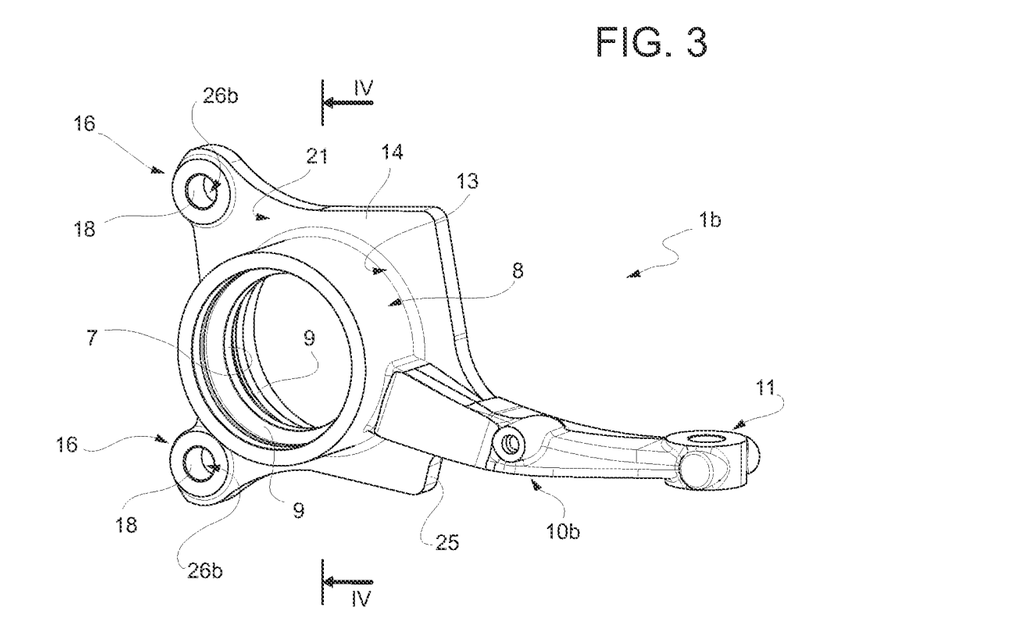
FIG. 3 schematically shows the same axonometric view as in FIG. 1 of a different embodiment of the mechanical component according to the invention.

With reference to FIGS. 3 and 4, where details similar or equal to those already described are denoted for ease of simplicity with the same reference numbers, a possible alternative embodiment of the component 1 described so far is denoted with reference number 1b.

According to this embodiment 1b, the holes 26 may be missing. The coupling of the flange 14 is then ensured only by the pins 28b, which pass through the lugs 16 and, consequently, also the flange 14 through only the holes 18, and by other connecting elements, such as, for example, welding seams (not shown) made along the perimeter edge 25, or adhesives spread on the face 27. The perimeter shape of the flange 14 may also differ from that of the outer ring component 1 and be especially designed for this variant.

Furthermore, still according to this variant 1b, the plate 29 and the ribs 32 may be missing and the steering arm 10 is replaced by a steering arm 10b of a different shape, but always made in one piece with the outer ring 1b and thus integrally in one piece with the lateral surface 8, the face and the flange 14, as previously described. As for the rest, the outer ring component 1b is identical to the outer ring component 1 described so far.

Figure 5:
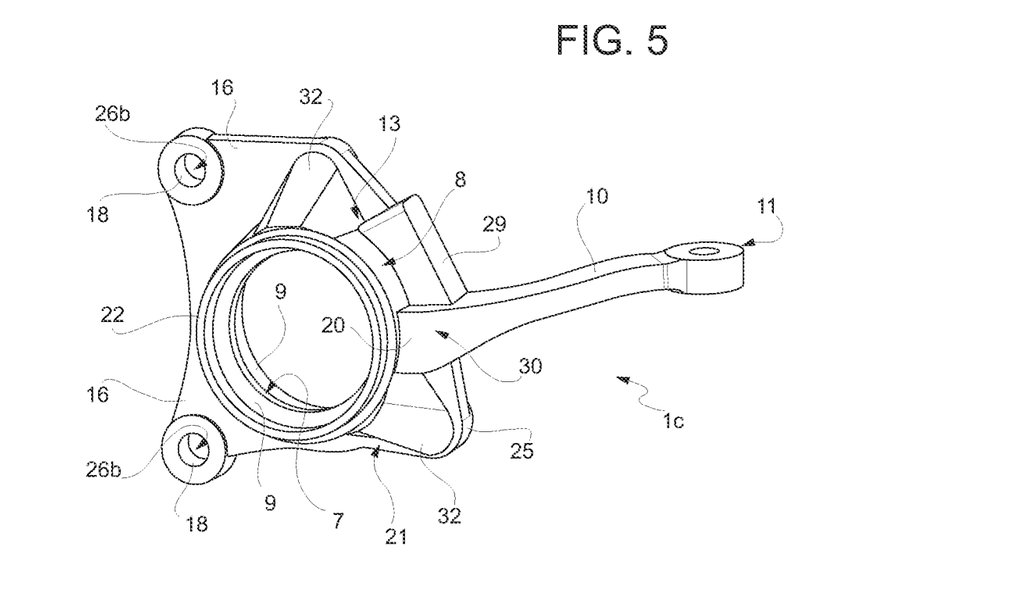
FIGS. 5 and 6 schematically show the same axonometric view as in FIG. 1 of two further different embodiments of the mechanical component according to the invention.

In FIG. 5 an annular component according to the invention is disclosed as consisting of a bearing outer ring 1c which is substantially identical, except for some details, to the outer ring 1 previously described. Details similar or equal to those already described are therefore denoted by the same reference numbers for ease of simplicity.

In particular, the holes 26 (again excluding holes 26b) are made as blind holes on the side of the radial ribs 32 and internally threaded. Furthermore, the plate 29 is not provided with the seat 31, but is prepared to receive it.

Instead, in the outer ring component 1, the holes 26 (still excluding the holes 26b) are through-holes, which pass axially through the radial ribs when they are present, as in embodiment 1 previously described.

Figure 6:
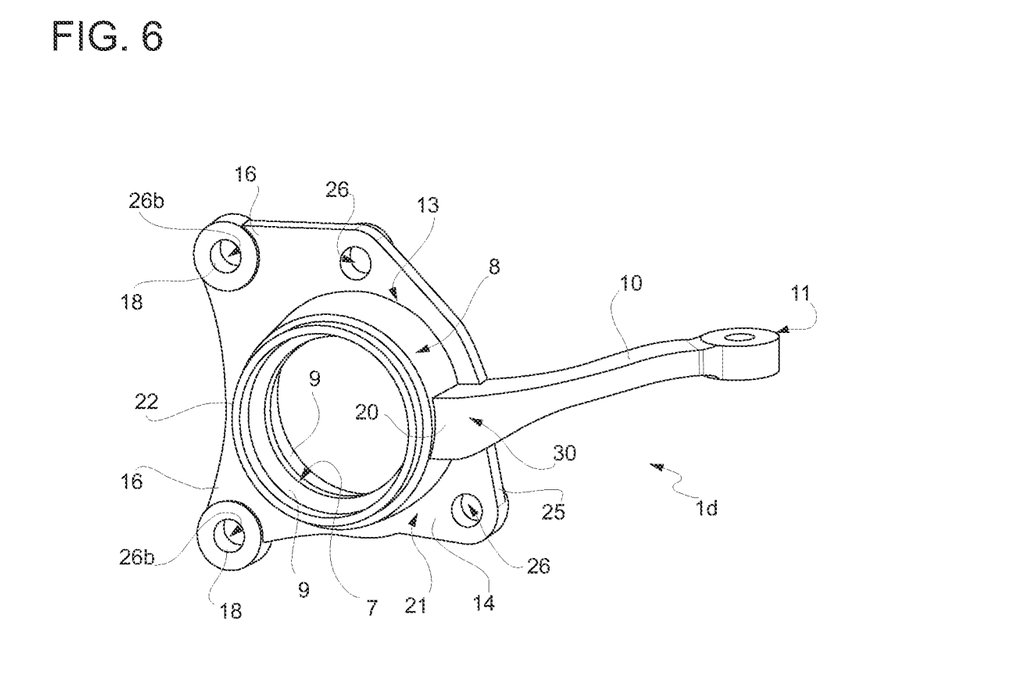

In FIG. 6 a variant 1d of the outer ring component 1 previously described is shown. Details similar or equal to those already described are denoted for ease of simplicity by the same numbers. This variant 1d is identical to the outer ring component 1, except that the ribs 32 and the radial plate 29 are missing.

Figure 7:
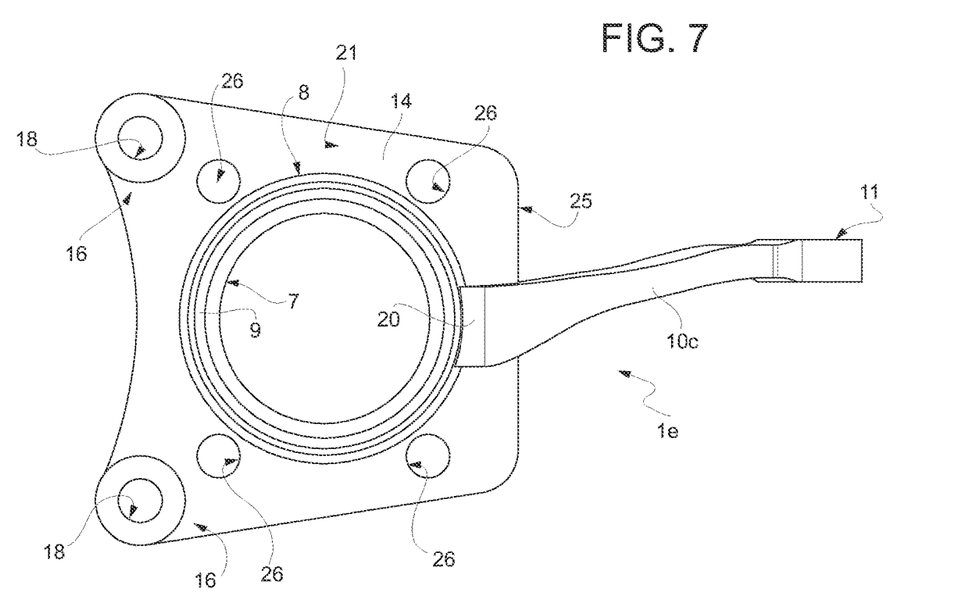
FIG. 7 schematically shows in an enlarged scale a front elevation view of a fifth possible embodiment of the mechanical component according to the invention.

In FIG. 7 a variant 1e of the outer ring component 1 previously described is shown. Details similar or equal to those already described are denoted for ease of simplicity by the same numbers. This variant 1e is substantially identical to the variant 1d, except that in this case the holes and the holes 18 are distinct and only the four holes 26 are configured for coupling the flange 14 to the suspension upright 3, while the holes 18 are only for housing pins (not shown for ease of simplicity) similar to the pins 28b for supporting, and connecting, the brake caliper 19. Furthermore, according to this variant, the steering arm 10 is replaced by a steering arm 10c also integrally machined in one piece with the side surface 8, the face 21, and the flange 14, but, unlike the steering arm 10 already described, it does not lie entirely in a radial plane passing through the axis A, but is circumferentially curved out of such plane so that the engagement point or element 11 is in an angular position slightly different from that occupied by the first section 20 of the same arm 10c.

Figure 8:
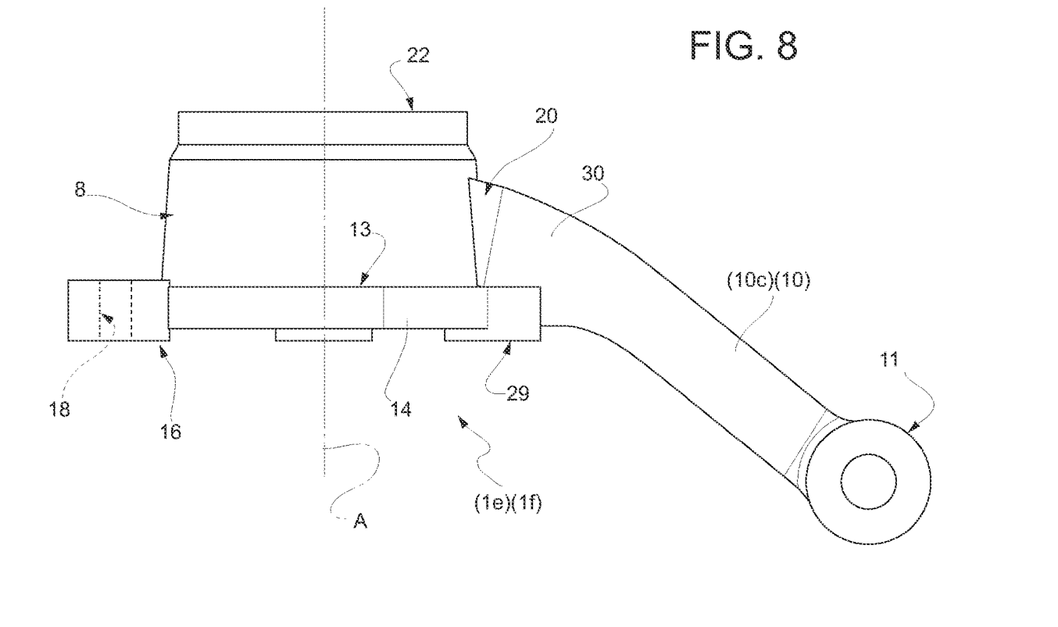
FIG. 8 schematically shows in a further enlarged scale a plan view from above of a mechanical component according to the invention.

Finally, FIG. 8 shows in an enlarged scale what could be considered a plan view from above of the outer ring component 1e of FIG. 7, or a further variant 1f of the outer ring component of the invention, identical to the outer ring component 1e except that the steering arm 10c is/would be in this case replaced by a steering arm 10 lying entirely in a single radial plane perpendicular to the axis A, as in the case of the embodiments 1, 1b, 1c and 1d. In addition, according to this possible variant 1f, the plate 29, which is absent from variant 1e in FIG. 7, is present.

From what has been described, it is evident that, according to a further important aspect of the invention, the steering arm 10 (or 10b), the flange 14 with the respective pair of radial lugs 16 and the first holes 18 are configured so as to obtain with respect to the radially outer lateral surface 8 of the outer ring 1, 1b, 1c, 1d, 1f an arrangement of flange 14, steering arm 10 or 10b, radial lugs 16 and first holes 18 that is specularly symmetrical simply by rotating the outer ring 1, 1b, 1c, 1d, 1f by 180° about an axis of symmetry A thereof coinciding with the axis of symmetry A of the radially inner lateral surface 7, which is substantially cylindrical.

It is finally clear that the invention applies also to a steering suspension of a vehicle 2 comprising a suspension upright 3 and a wheel hub unit 4 comprising, in turn, a mechanical component consisting of a radially outer ring 1 (or 1b, 1c, 1d, 1e, 1f) of the one wheel hub unit 4 or of a rolling bearing forming part of the wheel hub unit 4; where such outer ring is fixed integrally with the suspension upright 3 by means of a flange formed integrally in one piece with the outer ring and having the main feature that the outer ring 1 (or 1b, 1c, 1d, 1e, 1f) is provided integrally in one piece with a radially outer lateral surface 8 thereof and with the flange of a steering arm 10 (or 10b, 10c), extending radially cantilevered from the outer ring and the flange 14, and, on the side opposite to the steering arm 10, with a pair of axially drilled radial lugs 16, machined integrally in one piece with the flange 14 and configured to support in use a brake caliper 19.

The steering outer ring according to the invention improves material distribution if compared to a standard steering suspension upright with an equally standard wheel hub unit (HBU) assembled.

The centralisation of the functions in a single component (the radially outer bearing ring of the wheel hub unit):

a) results in a better use of the material and a less specific design of the suspension upright (simpler shape and possibly cheaper material);

b) allows saving weight if compared to the design of the state of the art (upright assembly provided with steering arm and HBU); and c) allows reducing the number of coupling tolerances due to the removal of an interface (i.e. contact surfaces) between the suspension upright and the outer ring of the wheel hub unit (HBU) that is fundamental along the two differentiated force paths flowing through the steering tie rod connection and brake caliper connections, to the raceways 9 for the rolling elements.

The centralisation of the material distribution around the outer ring of the bearing/wheel hub unit allows to save weight as regards the steering suspension upright (a less complex and less specific upright design can be used). The required structural performance is also guaranteed by the dedicated ribs 32 and by any other ribs that may be machined along the fixing lugs 16 of the brake caliper 19.

Moreover, the interaction in a single component of the steering arm (in its various possible variants), the ABS/wheel revolution sensor (even older ones), the mounting lugs 16 for the brake calliper 19 and the raceways 9 of the bearing/wheel hub unit not only ensures a better distribution of the mechanical operating stresses, but also an optimal distribution of the constructive material of the wheel hub unit/suspension upright assembly. The possibility of equipping the outer ring in its various versions with a flange having a certain number of mounting holes allows to use a single design for different solutions, with considerable constructional savings, especially taking into account that some of the holes (such as 26b) may also have the dual function of connecting the steering outer ring according to the invention with the remaining part of the suspension and also with the brake caliper support.

Finally, by decoupling part of the functions of the steering articulation and in particular the upper and lower connections, depending on the surrounding components, it is generally possible to achieve a single left/right design of the only "outer ring" component obtained by forging (with a difference in L/R machining) or even a completely symmetrical design (forging and machining), with substantial savings in production costs.

All the aims of the invention are therefore achieved.

The invention claimed is:

1. A mechanical component of a steering suspension of a vehicle, wherein the suspension comprises a suspension upright and a wheel hub unit, said mechanical component comprising a radially outer ring of the wheel hub unit or of a rolling bearing forming part of the wheel hub unit; said radially outer ring being bounded between a radially inner lateral surface and a corresponding radially outer lateral surface substantially coaxial with the radially inner lateral surface, the latter being provided with at least one annular raceway for respective rolling elements of the wheel hub unit; wherein, in combination:
    (i)—a steering arm provided with at least one respective attachment point for a steering tie rod extends radially from the radially outer lateral surface;
    (ii)—from a first axial end of the radially outer lateral surface extends radially cantilevered from the outer ring a flange configured to be in use attached integrally to the suspension upright;
    (iii)—the flange is provided radially cantilevered on a first side thereof with at least one pair of lugs obtained integrally in one piece with the flange and each provided with a first through-hole oriented parallel to an axis of symmetry of the outer ring and configured to support in use, integrally with the outer ring, a brake caliper;
    (iv)—the steering arm and the flange being integrally machined in one piece with the outer ring; and
    (v)—from the radially outer lateral surface of the outer ring extends radially cantilevered, a plate formed integrally in one piece with the flange and with the steering arm and which connects for a circumferential section of the flange, the flange itself to a portion of the steering arm which protrudes radially from the flange and which is immediately adjacent to the flange.

2. A mechanical component according to claim 1, characterized in that the steering arm, for at least a first section thereof facing towards the radially outer lateral surface, is made integrally in one piece with a first face of the flange facing on the side of a second axial end of the radially outer lateral surface, opposite to the first axial end; said first section of the steering arm forming on the first face a first radial rib of said flange, the steering arm moreover extending radially cantilevered from the flange, on the side of a second side of the flange opposite the first side, so that the steering arm and the lugs extend cantilevered from the outer ring on opposite sides thereof.

3. A mechanical component according to claim 2, characterized in that the flange is annular and is provided passing near a radially outer edge thereof with a plurality of second holes parallel to the first through-holes and configured to couple in use the flange solidly to the suspension upright; a second face of the flange, opposite and parallel to the first face being configured to couple in use in contact with the suspension upright; the second holes being configured to receive internally respective removable connecting elements chosen from a group consisting of screws, bolts, and pins, on the side of the second face of the flange.

4. A mechanical component according to claim 3, characterized in that a first pair of second holes are machined in correspondence with the first through-holes and are configured to receive in a passing-through manner respective pins or screws in turn configured to protrude axially cantilevered from the lugs and support the brake caliper coupled onto said lugs on the side of the first face of the flange.

5. A mechanical component according to claim 3, characterized in that the flange is provided in correspondence with at least some of the second holes, the second holes of the flange are of respective second radial ribs obtained integrally in one piece onto said first face, projecting axially towards the second axial end of the radially outer lateral surface; the second holes being obtained at least partially within said second radial ribs, where present.

6. A mechanical component according to claim 3, wherein said second holes are made as blind holes on the side of second radial ribs obtained integrally in one piece onto said first face, projecting axially towards the second axial end of the radially outer lateral surface, and are internally threaded, or as through holes, threaded or not, axially crossing the second radial ribs, where present.

7. A mechanical component according to claim 1, characterized in that said outer ring is provided at said first axial end of the radially outer lateral surface thereof with an annular centering collar/collet.

8. A mechanical component according to claim 1, characterized in that the steering arm, the flange with the respective pair of radial lugs and the first through-holes are configured to obtain with respect to the radially outer lateral surface of the outer ring a specularly symmetrical arrangement of flange, steering arm, radial lugs and first through-holes simply by rotating the outer ring 180° about an axis of symmetry thereof coinciding with an axis of symmetry of the radially inner lateral surface, which is substantially cylindrical.

9. A steering suspension of a vehicle comprising a suspension upright and a wheel hub unit comprising, in turn, a mechanical component comprising a radially outer ring of the wheel hub unit or of a rolling bearing forming part of the wheel hub unit; wherein the outer ring is fixed integrally with the suspension upright by means of a flange formed integrally in one piece with the outer ring; wherein the outer ring is provided with a steering arm provided integrally in one piece with both a radially outer lateral surface thereof and with the flange, extending radially outward from the outer ring and the flange, and, on the side opposite to the steering arm, with a pair of axially drilled radial lugs, provided integrally in one piece with the flange and configured to support in use a brake caliper; and wherein, in combination, from said radially outer lateral surface extends, radially cantilevered, a plate formed integrally in one piece with the flange and with the steering arm and which connects for a circumferential section of the flange, the flange itself to a portion of the steering arm which protrudes radially from the flange and which is immediately adjacent to the flange.

10. A radially outer ring for a wheel hub unit or for a rolling bearing forming part of the wheel hub unit; said radially outer ring being bounded between a radially inner lateral surface and a corresponding radially outer lateral surface substantially coaxial with the radially inner lateral surface, the latter being provided with at least one annular raceway configured to receive in use respective rolling elements of the wheel hub unit; wherein, in combination:
- (i)—from the radially outer lateral surface extends radially cantilevered from the outer ring a steering arm provided with at least one respective engagement interface configured to receive in use a steering tie rod;
- (ii)—from a first axial end of the radially outer lateral surface extends radially cantilevered from the outer ring a flange configured to be in use connectable integrally to a suspension upright;
- (iii)—the flange is provided radially cantilevered on a first side thereof with at least one pair of lugs obtained integrally in one piece with the flange and each provided with a first through-hole oriented parallel to an axis of symmetry of the outer ring and configured to support in use, integrally with the outer ring, a brake caliper;
- (iv)—the steering arm and the flange being integrally machined in one piece with the outer ring; and
- (v)—from said radially outer lateral surface extends, radially cantilevered, a plate formed integrally in one piece with the flange and with the steering arm and which connects for a circumferential section of the flange, the flange itself to a portion of the steering arm which protrudes radially from the flange and which is immediately adjacent to the flange.

* * * * *